(12) United States Patent
Aliaga et al.

(10) Patent No.: US 12,066,387 B2
(45) Date of Patent: Aug. 20, 2024

(54) MICRO SCALE IMAGE CAPTURE SYSTEM

(71) Applicant: SEDDI, INC., New York, NY (US)

(72) Inventors: Carlos Aliaga, Madrid (ES); Raúl Alcain, Saragossa (ES); Carlos Heras, Saragossa (ES); Iñigo Salinas, Saragossa (ES); Sergio Suja, Madrid (ES); Elena Garcés, Madrid (ES); Jorge López, Madrid (ES)

(73) Assignee: SEDDI, INC., New York, NY (US)

( * ) Notice: Subject to any disclaimer, the term of this patent is extended or adjusted under 35 U.S.C. 154(b) by 487 days.

(21) Appl. No.: 17/389,456

(22) Filed: Jul. 30, 2021

(65) Prior Publication Data

US 2021/0356407 A1   Nov. 18, 2021

Related U.S. Application Data

(63) Continuation of application No. PCT/ES2019/000016, filed on Feb. 22, 2019.

(51) Int. Cl.
  *G01N 21/88* (2006.01)
  *G01N 21/84* (2006.01)
  (Continued)

(52) U.S. Cl.
  CPC ..... *G01N 21/8806* (2013.01); *G02B 13/0055* (2013.01); *G03B 15/07* (2013.01);
  (Continued)

(58) Field of Classification Search
  CPC ....... G01N 21/8806; G01N 2021/8444; G01N 2021/8816; G01N 2201/062;
  (Continued)

(56) References Cited

U.S. PATENT DOCUMENTS

| 6,220,719 B1 | 4/2001 | Vetorino et al. |
| 2004/0179280 A1 | 9/2004 | Nishioka |

FOREIGN PATENT DOCUMENTS

| JP | H02125239 A | 5/1990 |
| JP | 2012124892 A | 6/2012 |
| WO | 2008076399 A2 | 6/2008 |

OTHER PUBLICATIONS

Nam G et al., "Simulataneous Acquisition of Microscale Reflectance and Normals", ACM Transcations on Graphics, ACM, vol. 35, No. 6, 2016, pp. 1-11.

(Continued)

*Primary Examiner* — Md M Rahman
(74) *Attorney, Agent, or Firm* — Marton Ribera Schumann & Chang LLP; Chien-Ju Alice Chuang; Hector J. Ribera

(57) ABSTRACT

According to various embodiments of the present invention, an optical capture system is provided. In one embodiment, a micro-scale optical capturing system is provided with low divergence (approximately 1°) of the incident light and low acceptance angle (<8°) of the captured light. According to embodiments, a micro-scale optical capturing system is provided with a large number of collimated high-power white LEDs as light sources, between 60 and 100 units, for example, and may be positioned at distances of about 650 mm from the sample. In one embodiment, a digital camera using 50 mm focal objective with a 25 mm length extension tube captures images of the sample. This provides a working distance of approximately 100 mm and at the same time maintains ×0.5 magnification for microscale captures, with an image size of 4×4 microns per pixel.

26 Claims, 6 Drawing Sheets

(51) Int. Cl.
  *G02B 13/00* (2006.01)
  *G03B 15/07* (2021.01)
(52) U.S. Cl.
  CPC ............... *G01N 2021/8444* (2013.01); *G01N 2021/8816* (2013.01); *G01N 2201/062* (2013.01); *G01N 2201/0633* (2013.01); *G01N 2201/10* (2013.01)
(58) Field of Classification Search
  CPC ....... G01N 2201/0633; G01N 2201/10; G01N 2201/06153; G02B 13/0055; G03B 15/07
  USPC ...................................... 356/237.2
  See application file for complete search history.

(56) References Cited

OTHER PUBLICATIONS

International Application No. PCT/ES2019/000016, International Search Report and Written Opinion mailed Oct. 28, 2019, 10 pages.
Zhao et al., "Building Volumetric Appearance Models of Fabric Using Micro CT Imaging", SIGGRAPH Proceedings, 2011, pp. 1-10.
Schwartz et al., "Design and Implementation of Practical Bidirectional Texture Function Measurement Devices Focusing on the Developments at the University of Bonn", Sensors, 2014, pp. 7754-7819.

| 6102 | 6650 | 5108 | 5544 | 5831 | 4964 | 5103 | 5513 | 5233 |
|------|------|------|------|------|------|------|------|------|
| 5731 | 5936 | 5769 | 5515 | 5613 | 5251 | 5382 | 5114 | 5871 |
| 5564 | 5894 | 5357 | 5406 | 5120 | 5270 | 5545 | 5442 | 5853 |
| 5682 | 6064 | 5636 | 5147 |      | 5287 | 5361 | 5817 | 5487 |
| 5480 | 5909 | 5047 |      |      |      | 5676 | 5569 | 5824 |
| 5217 | 6242 | 5316 | 5263 |      | 5109 | 6091 | 5312 | 5551 |
| 5653 | 6207 | 5431 | 5854 |      | 5608 | 5870 | 5697 | 6211 |
| 6010 | 6171 | 6178 | 5708 | 5981 | 6198 | 5838 | 5540 | 5403 |
| 5317 | 6087 | 5588 | 5745 | 6090 | 5668 | 5801 | 5352 | 5710 |

FIG. 6

MICRO SCALE IMAGE CAPTURE SYSTEM

CROSS-REFERENCE TO RELATED APPLICATIONS

This application is a continuation of International Application No. PCT/ES2019/000016 titled "Micro Scale Image Capture System," filed Feb. 22, 2019, which is incorporated herein by reference in its entirety.

BACKGROUND

This disclosure generally relates to computer modeling systems, and more specifically to a system and method for micro-scale image capturing of geometric and optical properties of materials for use in computer graphics and other applications.

In computer graphics applications, the accurate and lifelike modeling of materials, such as fabrics, clothing, and other items made of fibers, has been a long-standing goal, and a key component for realistic animations in video games, films, and other computer-modeling applications. For example, materials like fabrics were traditionally modeled as two-dimensional sheets of very thin composition, Models for simulation of different materials typically focused on the appearance of the surface or surfaces of the two-dimensional sheet model. However, these models lacked detail and realism, particularly when examining up close or in scenes or other vignettes where the material was displayed close to the viewer. For example, in avatar-based online shopping applications, an avatar models items of clothing for a consumer who is trying to make a purchase decision. In such applications, the detail and realistic appearance of the clothing is critical. A sweater made of thick wool yarn cannot be accurately modeled in the surface of a two-dimensional sheet. With the recognition of these shortcomings, more recently, new approaches have developed for more realistic 3-dimensional modeling of materials, like cloth or fabrics.

However, these newer modeling approaches require detailed information about the characteristics of the modeled material. To obtain this information, optical capturing systems are needed for accurately extracting the geometric and optical properties of materials that allow the modeling of the appearance of those materials under any lighting condition. One approach is to use optical imaging to derive geometric and appearance parameters of the materials to for example create virtual models of the materials for use in computer graphics applications.

Most existing devices are targeted to capture generic surface-like materials at a millimeter scale, usually focused in extracting the surface normals and its reflectance, the latest in the form of a Bidirectional Reflectance Distribution Function (BRDF) that can be spatially varying (SV-BRDF). For this, digital cameras are used to capture images with basically two approaches. One approach uses multiple viewing and lighting directions covering the hemisphere centered in the normal of the material surface in order to recover the Bidirectional Reflectance Distribution Functions (BTF). The other one relies on a single fixed view and multiple luminaires. All these systems commonly work with small magnification relations (Schwartz et al., *Design and implementation of practical bidirectional texture function measurement devices focusing on the developments at the University of Bonn*, Sensors 2014 (Switzerland)), since they are interested in recovering the SV-BRDF or the BTF since they need a number of different viewing directions. This implies many issues related to depth of field at grazing angles, particularly critical when trying to reach very fine resolutions at the fiber level. Thus, these kind of solutions are very useful for mid-distance material appearance modeling, but do not provide small enough pixel size and therefore are not well suited when the goal is to extract geometric and optical properties for later use in a realistic rendering context, for instance in the case of realistic fabrics.

Very few prior systems present a microscale optical capturing system. A recent example is the work of Nam and colleagues (Nam, G., Lee, J. H., Wu. H., Gutierrez, D., & Kim, M. H. (2016). *Simultaneous acquisition of microscale reflectance and normals*. ACM Transactions on Graphics. https://doi.org/10.1145/2980179.2980220). They implement cameras with macro lenses, leading to very short optical working distances that allow reducing the dimensions of the system up to a few tens of millimeters. Their system uses multiple LEDs and a fixed viewing direction, working with up to 5:1 magnification. All components are built in a 40 mm radius dome and captured sizes are of the order of 2 millimeters. Similar systems are also described in Nam, G., Lee, J. H., Wu, H., Gutierrez, D., & Kim, M. H. (2016). *Simultaneous acquisition of microscale reflectance and normals*. ACM Trans. Graph, 35(6), 185.

However, systems with such small dimensions are not always suitable for predictive rendering in some contexts, such as for example in the textile industry. The reason is that some materials can be seen as a structured tile along the material repeating in patterns. For these types of materials, the minimum tile-size structure can often be much larger than 1-2 mm, as is the case for a great percentage of fabric types. Thus, a capturing system operable for these types of materials needs a compromise between magnification and sample size. This is not simple to accomplish due to the thickness that some fibers can present, some below 5 microns, and the self occlusions of the system at such short working distances.

Relevant optical parameters for microscale capturing systems are the divergence of the incident lights and the acceptance angles for the captured light. For industry purposes, exposure times become also critical. All of them are related to the dimension of the sample and the distances from the light sources and the camera to the sample. As distances become shorter and/or samples become larger, divergences and acceptance angles increase. The impact of these optical factors on the accuracy of the measured reflectance can be relevant, impairing final results of the rendering processes.

Other approaches to capturing material characteristics for subsequent computer modeling include systems to for example derive volumetric models of fabrics employ. X-ray, computed tomography (CT) scans to capture the fabric's parameters. For example, one such system is described in Zhao, S., Jakob, W., Marschner, S., & Bala, K. (2011). *Building volumetric appearance models of fabric using micro CT imaging*. ACM Transactions on Graphics (TOG), 30(4), 44.

However, CT scan systems are very expensive and require large spaces to operate in. Microscope-based optical systems are also used for some applications. However, for examination of samples of larger size, in the few millimeter to centimeter range, microscope-based systems cannot properly illuminate the entire sample and performing an inspection or capture of the key parameters would take an inordinate amount of time. On the other hand, optical systems without sufficient magnification, less than 1:1 magnification, cannot obtain sufficient details to properly capture the relevant parameters in a sample, and therefore are not optimal for many applications. Some systems provide close to 1:1 magnification with optical sensors but their lighting components do not provide a uniform flat-wave illumination of the samples, requiring complex post-processing of the images and pre-processing characterization of the illumination conditions at each potential sample point.

In addition to uses for computer modeling, these types of imaging systems are important for other fields. For example, automated visual inspection of objects and material specimens is important for various applications. For example, automated visual inspection for quality control of manufactured items is routinely used to provide high accuracy and consistency in the evaluation of manufacturing activities.

No current system is able to obtain images of material samples with a ratio of magnification close to 1:1 using lighting from multiple angles of incidence and from sufficient distance to ensure flat wave front light illumination, minimizing self-occlusions.

Thus, what is needed is a micro-scale optical imaging system capable of substantially 1:1 magnification and frontwave planar illumination that addresses the deficiencies of the prior art.

BRIEF SUMMARY

According to various embodiments of the present invention, an optical capture system is provided. In one embodiment, a micro-scale optical capturing system is provided with low divergence (1°) of the incident light and low acceptance angle (<8°) of the captured light. According to embodiments, a micro-scale optical capturing system is provided with a large number of collimated high-power white LEDs as light sources, between 60 and 100 units, and may be positioned at distances of about 650 mm from the sample. In one embodiment, a digital camera using 50 mm focal objective with a 25 mm length extension tube captures images of the sample. This provides a working distance of approximately 100 mm and at the same time maintains ×0.5 magnification for microscale captures, with an image size of 4×4 microns per pixel.

According to embodiments, the optical system is capable of providing polarization analysis by separating diffuse and specular light components, and depth analysis using focal stacks due to a very shallow depth of field provided in some embodiments. According to embodiments, the design of the system makes it robust to vibrations and takes into account all the mentioned optical factors in order to assure a suitable system specialized for capturing fibrous materials. It improves previous approaches for such goals, and it is optimal for capturing high quality data that can be used to achieve realistic rendering fabrics.

According to one embodiment, a micro-scale imaging system is provided that comprises an imaging module. The imaging module includes an optical sensor, an extension tube, and a lens. The lens is coupled to the extension tube and the extension tube disposed in front of the optical sensor guiding light from the lens to the optical sensor. The optical sensor includes a plurality of pixels having a pixel size. The lens is configured to enable the optical sensor to capture, for each pixel of the plurality of pixels, an imaged area of a fabric sample of substantially the same size as the pixel size. The system may also include a sample holder configured to hold the fabric sample for imaging. The sample holder is also configured to present the fabric sample to the imaging module without obstruction of incident light or reflected light. The system also includes a lighting module including a plurality of light units spatially arranged around the sample holder and directed towards the sample holder. Each light unit is configured to provide a planar wave front illumination of the incident light on the fabric sample. In this embodiment, the lens in the imaging module is positioned with respect to the optical sensor and the extension tube to allow the imaging module to be positioned with respect to the sample holder so as to avoid occlusions of the incident light from the lighting module and so as to capture the reflected light at a substantially planar wave front.

In a system according to one embodiment, each light unit may include a collimating lens dimensioned to maximize an intensity of the incident light projected by each light unit on the fabric sample. For example, in variations of this embodiment, the collimating lens in each light unit has a diameter of between 0.5 and 1.5 inches. In variations of this embodiment, the collimating lens in each light unit may have a nominal focal length of between 15 and 20 mm. In other embodiments, in each light unit, the collimating lens may be positioned at a distance from a source of light in the light unit that is between 5% and 20% of the nominal focal length of the collimating lens.

In this embodiment, each light unit may comprise one or more high-power white LEDs. In variations of embodiments, the optical sensor may be one of a monochrome sensor or a color sensor. In variations of embodiments, the imaging module mayh include a monochrome sensor and a filter module, the filter module comprising a plurality of filters, each filter configured to filter a light wave length. In variations of the system, it may also include an imaging module further comprising a filter module, the filter module including a polarization filter configured to filter the reflected light before reaching the optical sensor. In variaionts of the system, it may also include a focusing system that comprises a linear displacement platform and a motor, the linear displacement platform mechanically supporting the imaging module and coupled to the motor for linearly moving the imaging module in the direction of the fabric sample, closer or further away, for focusing the imaging module on the fabric sample. In other embodiments, the system may also include a focusing system that comprises a membrane lens configured to modify a focal point based on a change to an index of refraction.

In variations of embodiments, the sample holder may further comprise a mount and an electronically controlled motor. The mount is configured to be moved by the electronically controlled motor for automatically scanning the fabric sample with the imaging module. In variations of embodiments, each light unit of the plurality of light units may further comprise a rotatable fastener, the rotatable fastener for mechanically attaching the light unit to the lighting module and allowing rotational motion of the light unit to direct the light unit towards the sample holder.

BRIEF DESCRIPTION OF THE SEVERAL VIEWS OF THE DRAWINGS

FIG. 6 illustrates the average color temperatures for a lot of LEDs according to one embodiment.

The figures depict various example embodiments of the present disclosure for purposes of illustration only. One of ordinary skill in the art will readily recognize form the following discussion that other example embodiments based on alternative structures and methods may be implemented without departing from the principles of this disclosure and which are encompassed within the scope of this disclosure.

DETAILED DESCRIPTION

The above and other needs are net by the disclosed methods, a non-transitory computer-readable storage medium storing executable code, and systems for optical capture of geometric and optical properties of materials for use modeling of materials in computer applications, including, for example, garment design and virtual modeling, motion capture applications, biomechanics and ergonomics design and simulation, education, business, virtual and augmented reality shopping, and entertainment applications, including animation and computer graphics for digital movies, interactive gaining and videos, human, animal, or character simulations, virtual and augmented reality applications, robotics, and the like.

The Figures and the following description describe certain embodiments by way of illustration only. One of ordinary skill in the art will readily recognize from the following description that alternative embodiments of the structures and methods illustrated herein may be employed without departing from the principles described herein. Reference will now be made in detail to several embodiments, examples of which are illustrated in the accompanying figures.

The systems and methods according to the various embodiments described a micro-scale image capture system. In embodiments, an automated image capture system with 1:1 magnification ratio from multiple points of flat wave front illumination, minimizing self-occlusions, is provided.

Figure 1:
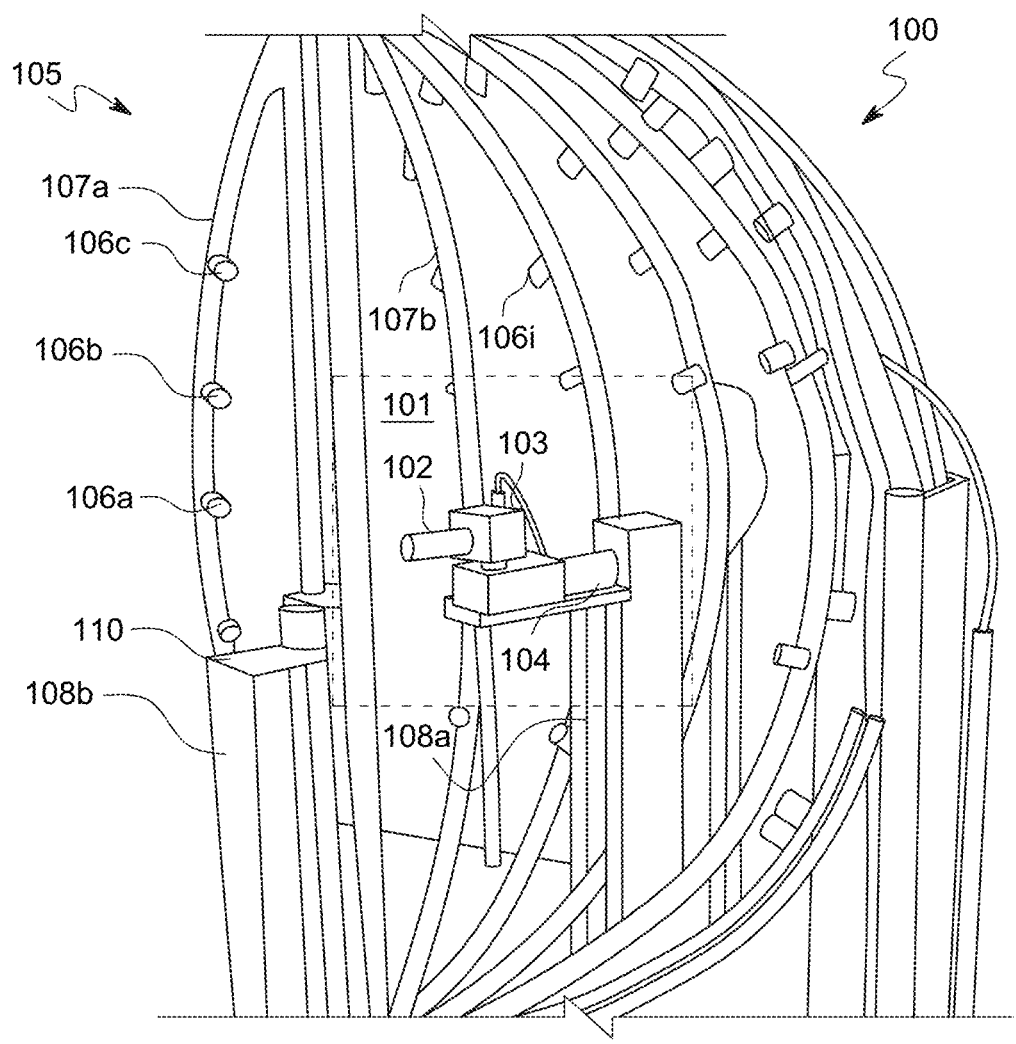
FIG. 1 illustrates a micro-scale image capture system according to one embodiment.

Now referring to FIG. 1, a micro-scale image capture system is illustrated according to one embodiment. The system 100 includes an image capture sub-system 101, a lighting sub-system 105, and a sample holder 110. The image capture sub-system 101 includes a lens arrangement 102 that is coupled to an imaging sensor 103 to image the sample. In some embodiments, the image capture sub-system may also include a motor 104 coupled to the lens arrangement 102 and the imaging sensor 103 for moving the combined assembly in the direction of the sample, closer or further away, for focusing of the desired image. In other embodiments, the image capture sub-system 101 include additional sets of lenses and imaging sensors for simultaneously capturing larger areas of the sample.

In one embodiment, the lighting sub-system includes a set of lighting units 106a-106n, configured to illuminate the sample from a plurality of angles. In one embodiment the lighting sub-system includes supported a housing cage 105. In one embodiment, the housing cage 105 is a hemisphere-shaped structure, built with black anodized aluminum profiles 107a-107n. In the embodiment illustrated in FIG. 1, there are nine aluminum arms 107a-n, formed by nine sections. The arms 107 support the light modules 106 pointed towards the target in the sample holder 110.

In one embodiment, sample holder 110 can be displaced using an XY translation mount to capture different sections of the sample. In one embodiment, the holder 110 can also be rotated to capture both sides of the sample. In embodiments, the XV displacement and/or rotation may be accomplished with one or more electronically controlled motors to provide repeatable precision in the sample movement. In embodiments, the holder 110 is dimensioned to meet the requirement of minimal light occlusions that could shadow the target. According to embodiments, the sample holder 110 is sized to hold material samples of up to approximately 150×150 mm. The mechanical structure of the holder 110 is designed to be small but robust, minimizing the possibility of casting shadows over the sample when illuminated by light sources from multiple directions. In one embodiment, the system provides automatic characterization of the different points of measurement along the surface of a sample on the sample holder 110. This is accomplished by providing automated positioning of the sample holder 110 for capturing every variation along multiple areas of the sample. The motorized sample holder 110 moves the sample in front of the lens, displacing the sample in x and y directions along the frontal plane of capture. This way the sample can completely traverse the capture zone of the close-up imaging module. In one embodiment, the system includes a distant imaging module for analyzing an entire sample and to determine a set of measurement points on the sample as further described below.

The sample holder 110 and the image capture sub-system may be supported by pedestals 108a and 108b. In one embodiment, the cage structure 105 is completely isolated from the pedestals 108a and 108b, in order to avoid any mechanical vibrations during the image capture process.

Figure 2:
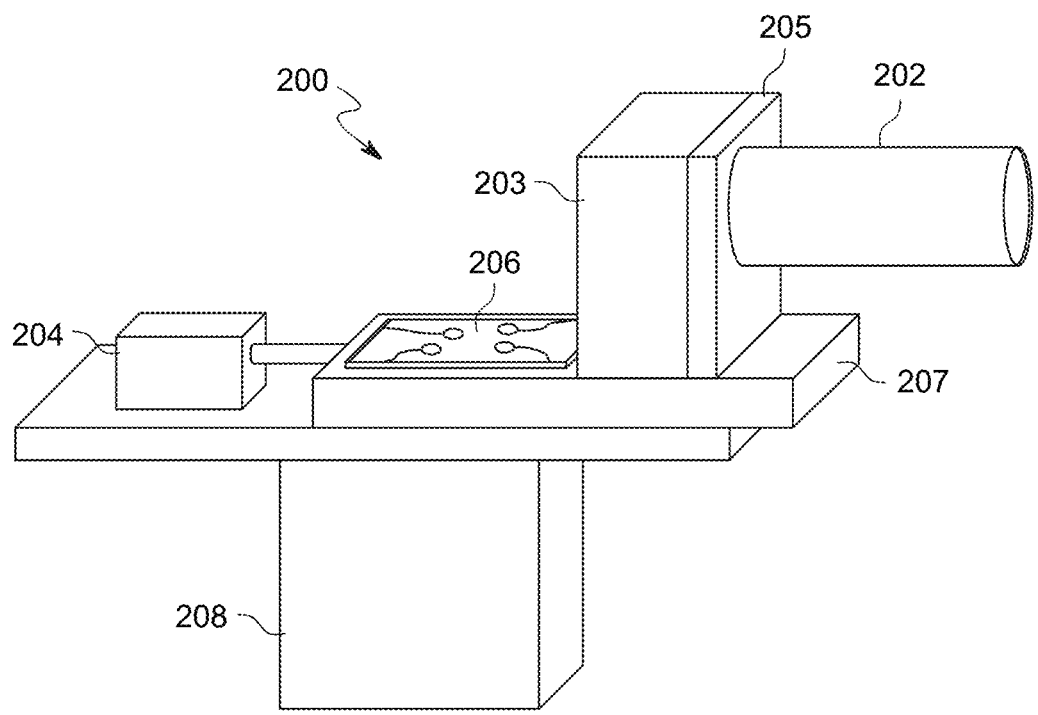
FIG. 2 illustrates an imaging module according to one embodiment.

Now referring to FIG. 2, an image capture sub-system is illustrated according to another embodiment. In one embodiment, the image capture sub-system includes a close-up module 200 with an optical system 202 coupled image sensor 203 through a filter module 205. A controller 206 controls the capturing by the sensor 203, the filter module 205, and the focusing motor 204, In one embodiment, these components are attached to a sliding mechanical base 207 that can be pushed and pulled by motor 204 in the axis perpendicular to the sample holder. The close-up module 200 works on small areas of the sample, for example, approximately 10×10 mm to 100×100 mm, with a magnification of 1:1.

In embodiments, the image sensor 203 may include a charge-coupled device ("CCD") camera, a complementary metal oxide semiconductor ("CMOS") camera, or similar camera sensors. In embodiments, the image sensor 203 can be from a few Megapixels to several tens of Megapixels and may be either monochrome or color.

Sensors with the smallest pixel size provide the best capability to resolve the smallest possible size of the material per pixel. In addition, for the same pixel size, a monochrome CCD provides better resolution than a color CCD, due to the built-in color filters mosaic of the latter. In one embodiment, the image sensor 203 includes a monochrome camera of 2 microns in pixel size, and a color camera of 1 micron in pixel size. The color camera has the advantage that for red-green-blue color ("RGB") captures it does not require color filters (as further explained below), removing filter alignment and distortion corrections and reducing the capture times of the material by a third.

In one embodiment, in order to capture fabric materials, capturing the thickness of the individual fibers forming the cloth, typically in the order of a few microns, the close-up module 200 provides a resolution of 4×4 microns per pixel. In this embodiment, the system is able to capture images of around 10×10 mm in size, in order to determine the fabric structure at the yarn level, which is usually in such range of sizes. In this embodiment, the image sensor 203 includes a Mightex SME-B050 monochrome camera, with a 2560× 1920 resolution and a 2.2×2.2 pixel size.

Referring back to FIG. 2, the close-up module 200 further includes an optical system 202 for capturing light reflected by the sample and directing it to the image sensor 203. The optical system 202 includes a lens and an extension tube to ensure a ratio of approximately 1:1 and a working distance large enough to minimize lighting occlusions on the sample. The extension tube is sized to place the sensor 203 and lens at a specific distance so that the sample will be in focus at another specific distance, allowing illumination of the sample without shadows from the camera. This provides for a zoom-in of the sample at the cost of making the depth of field narrower. For example, in the fabric-specific embodiment referenced above, a 50 mm focal lens with a 25 mm extension space provides a 0.5 magnification at a distance of 100 mm. The space works as an extension tube and is key to achieve a large working distance without losing magnification. Such large distance is required to avoid the systems to cast shadows on the fabric sample, that is, reducing light occlusions to the minimum possible.

To obtain an X:Y magnification ratio, optical systems have to work with an X:Y ratio of object and image distances. The image distance is determined by the distance from the main plane of the lens's output to the image sensor. If the lens is mounted directly on the body of the sensor, very close to it, the resulting image distance is small. If the ratio is 1:1, the object distance is also small, which forces the optical system to be very close to the sample, causing occlusions of many points of illumination. Extension tubes are placed between the lens and the sensor housing so that the optical system can be placed further away from the sample, maintaining the ratio of magnification at the same time. Thus, the main output plane of the lens is moved away, increasing the image distance, increasing the object distance, and allowing the sample to be placed further away from the sensor, so that the solid angle of self-occlusions is reduced as much as possible.

The magnification properties of micro-scale imaging systems allows the system to capture details of the material, such as features of fibers in a yarn, and it allows for the camera to be sufficiently far from the sample to allow for uniform lighting of the sample. For example, a microscope could allow for small details of fibers in a yarn to be captured, but it would take a long time to process a typical sample (e.g., 150×150 mm). It would also have to be very close to the sample, making uniform illumination of the sample very difficult. In addition, the shallow depth of field of the microscope would require processing a textile of average thickness by processing all-in-focus images, which would require taking several images with different focal distances to capture the full thickness of the textile sample. Additionally, in order to derive the optical parameters typically required for proper modeling of the material, the optical capture process requires variation of light directions along the hemisphere captured in different images. The working distance of a microscope does not allow that, since most of the hemisphere is occluded by the device itself and the lighting available tends to be close to the sample and from a single direction.

In one embodiment, a monochrome camera sensor 203 is used and a color filter system 205 is used to capture the images. The color filter system 205 includes a rotating, electronically controlled motor that places each of the filters between the camera lens 202 and the image sensor 203. The color filters may correspond to any desirable light wavelength, between ultraviolet and infrared. Some embodiments, for example, may use three filters for the three primary colors, Red, Green, and Blue (RGB), but any other color or light wavelength may be used in any combination. It should be noted that the filter system 205 may also be placed in front of the optical module 202 in some embodiments. In one embodiment, the filter system 205 is placed in the area of the expansion tube closest to the sensor 203 to be as far from the sample as possible to avoid self-occlusions coming from the filters casting shadows on the sample. For example, in one embodiment, a multi-position motorized filter slider with three RGB filters is placed at the space between camera and lens. With these filters, the system can perform color analysis without the loss of resolution due the placement of the pixels in the mosaic of a color sensor (Bayer pattern).

According to another aspect, in some embodiments, the color filter lenses themselves may produce chromatic aberration due to differences or imperfection in the lenses, resulting in images that have different placement and focus for each light wavelength channel, possible causing patterns of blur for different colors, To correct this, the camera leverages a high precision linear motorized displacement unit 204 that provides the correct focus each time the color filter is changed. This ensures that the images in each of the wavelength channels have the highest resolution possible. For example, in one embodiment, 3 pictures are taken with the monochrome camera sensor 203 with each of the three RGB filters. A post processing algorithm corrects the per channel radial distortions and aligns the 3 channels so that the image is clean.

According to another embodiment, the filter module 205 includes a polarization system. In this embodiment, filter module 205 uses the motor to place in front of the image sensor 203 either a filter parallel to the polarization of the incident light on the sample or a filter perpendicular to it. The purpose is to differentiate in the captures between light specularly reflected by the sample and diffuse reflected light, since multiple scattering is known to depolarize light after a number of light bounces. In order to infer the optical properties of the material sample, it is helpful to isolate every light component as much as possible so that the overall system parameters may be optimized. For any optically thick material, light interacts with the material entering in one point and exiting the material in a different point, with a different direction, after several optical events, such as scattering and absorption, inside the material. In this context, it is known that polarized light becomes depolarized after several light interactions within the material. The polarization system separates the first bounce of light, the specular term, which is always of the color of the illuminant (e.g., white), from the rest of the light resulting from multiple scatterings. These other light reflections contain information about the absorption of light wavelengths in the material, which determines color (dye), among other things.

Referring back to FIG. 2, in one embodiment, the close-up module 200 also includes a focusing system 204. The focusing system 204 may be implemented in different ways according to various embodiments. For example, in one embodiment, the focusing system includes plurality of lenses (not shown) with varying focal lengths to change the focus plane. In another embodiment, a focal membrane (not shown) is provided. The focal membrane comprises a plane-convex lens arrangement for modifying the index of refraction so as to modify the focal point of the close-up camera. In yet another embodiment, the focusing system 204 includes a mechanical focusing system. The mechanical focusing system includes a high precision linear displacement platform 207 on which camera 203, optics 202 and filters 205 (RGB, polarized, etc.) are placed. This linear displacement platform 207 is driven by a stepper motor. Thus, it is possible to focus and blur the captured image in an automated and controlled way, by moving the capture system closer or further away from the sample. This controlled motion also allows for performing depth analysis of the samples by using focal stacks and depth from defocus techniques.

To focus the sample, a lens with autofocus could be used in the lens system. However, an autofocus lens is not always compatible with an extensor tube, since the mechanical connections between the focusing motors that move the lenses and the actual lenses would be separated by the tube. In addition, placing filters 205 between such an autofocus lens and the image sensor 203 would also be difficult. Therefore, in embodiments using an extensor tube and filters between the lens and the image sensor the system focuses by displacing the entire close-up module with a stepper motor 204, approaching or moving away from the sample.

Figure 3:
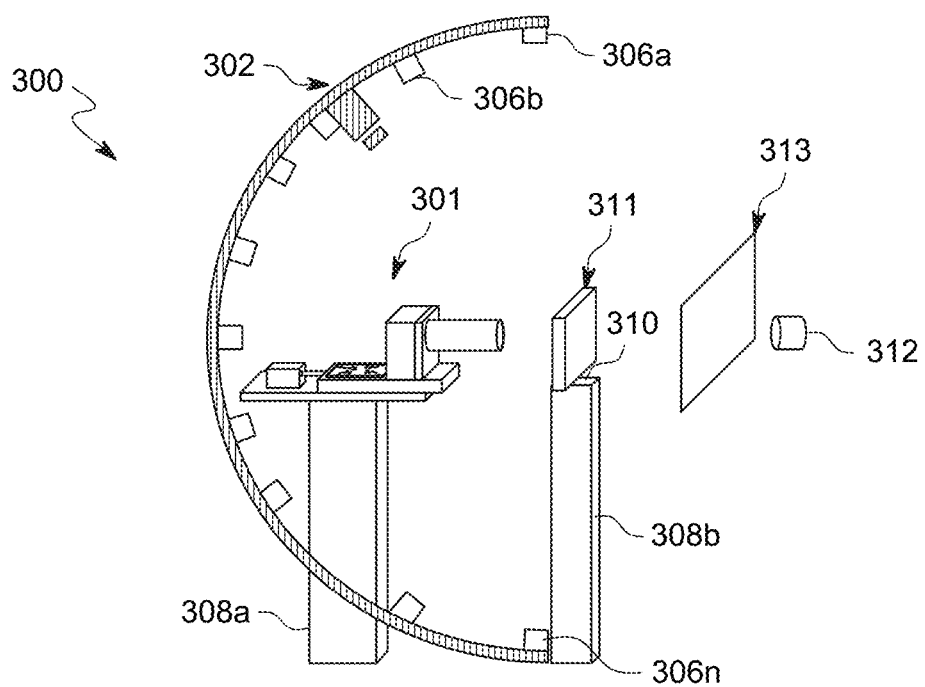
FIG. 3 illustrates a perspective view of a micro-scale image capture system according to one embodiment.

Now referring to FIG. 3, a diagram illustrating a microscale optical capturing system according to one embodiment is provided. In this embodiment, the system 300 includes a close-up imaging module 301 and a distant imaging module 302. The distant imaging module 302 images the larger material sample 311 being held at the sample holder 310. For example, a material sample of approximately 150×150 trim can be captured by one or more cameras in the distant imaging module 302. The distant imaging module 302 captures an image of the whole sample of the material to identify all the different areas of the sample, for example, due to printed patterns, yarn structure, etc. Each of the identified areas in the sample will require a capture at micron resolution with the close-up module 301.

According to one embodiment, the distant imaging module 302 includes a frontal camera that captures a picture of the entire sample. e.g., 15×15 cm. The camera may be a CCD or CMOS camera and may also include an optical system with autofocus. The camera and the lens are directly coupled and remain fixed in a distant position away from the sample holder 310. This position avoids occlusions of the illuminations and ensures that the capture of the fabric is as perpendicular as possible to the sample so that the images taken provide a representative location of the sample within the holder. This reduces the postprocessing needed to identify the location, e.g. coordinates, of the different areas in the sample.

The image captured by the frontal camera is processed by an image processing algorithm, either provided within the distant module or at a separate computing system (not shown) to automatically detect any variation in structure, color, dye, patterns, printed patterns, or the like. The image processing segments the image into regions of interest and provides coordinates for each of the regions. These coordinates, for example, x-y coordinates with reference to a corner of the sample holder 310, are then used to direct the close-up imaging module 301 to each of these regions to capture microscopic images of the sample. Both systems automatically determine the minimum crop of the images that represent the minimum tileable structure to work with.

In these embodiments, the close-up module 301 is guided by the distant module 302 to point in a certain area of the sample 311 to then capture a sequence of images of the sample. Fax example, each image in a sequence provides a representative image of a specific section of the sample lit from different light sources. The data is then used by post processing algorithms to generate the digital images of the material and extract structural and optical parameters that allow a mechanical and optical simulation engine to virtually reproduce the material.

According to embodiments, the distant imaging module 302 may also include additional cameras (not shown). For example, in one embodiment two additional cameras are placed in grazing angles (around 80 degrees from the normal direction of the sample 311 or 10 degrees from the sample plane), one perpendicular to the other. These cameras capture images of the entire sample to provide additional reference data to optimize the optical properties of a given sample characterization session, where a rendering engine generates synthetic images varying optical parameters so that the simulations match the real captures of such cameras at those critical angles, in this embodiment, one frontal camera and two grazing cameras.

Referring back to FIG. 3, in embodiments, the system comprises an illumination module with a plurality of lighting units 306a-306n. The lighting units 306a-306n (also shown in FIG. 1 as 106a-106n) are arranged around the sample holder. For example, in embodiments, the lighting units 106/306 are placed at regular intervals, such as for example every 18-20 degrees, around the arms of a hemispherical mechanical structure pointing to the sample holder 310. In some embodiments, a backlight 312 is also provided. The backlight 312 may be diffused a diffuser 313. In these embodiments, the diffused backlight allows for capturing the transmittance from backlight illumination. The backlight 312 and diffusor 313 may be removable in order to avoid inserting a white surface in the background of the sample that is viewable through the spaces between yarns. Alternatively, the backlight 312 and diffuser 313 are set up at a location that does not fall within the frame of the camera. In embodiments, the backlight 312 and diffuser 313 and provided in a diffused backlight set (not shown) that is removably attached to the system. For example, in some embodiments, the diffused backlight set may be attached to the sample holder 310.

In embodiments, the diffuse backlight set includes a light source backlight 312, a diffuser layer 313, and an electrochromic layer between the light source and the diffuser. For example, in one embodiment, the light source may be a white area LED light source, including for example, a thin LED device emitting a homogeneous diffuse white light along its surface. The diffuser may be a translucent glass layer. For example, a glass with a rough surface and anti-reflectance coating, in order to minimize the reflection originated from the dome light sources, specially at gracing angles. The diffuser also shows enough transmittance to let the light coming from the white area LED pass through. The electrochromic layer may be placed between the white area LED source and the diffuser. The electrochromic layer turns opaque (e.g., black) when an electric current is set, in order to minimize secondary bounces and reflections when the sample is illuminated from the dome. When the white area LED is turned on, the electrochromic layer becomes transparent by turning off the electric current, letting the light pass through the sample from behind, so the camera captures the transmittance properties of the sample. In embodiments, the diffused backlight set is placed as close as possible to the sample holder 310, so that the divergence of rays emitted from a differential area of the backlight set is as similar to a full hemisphere of outgoing directions as possible. As noted above, the diffused backlight set can be detached from the sample holder so that the sample holder can turn 180 degrees to capture the back side of the fabric. The detachment may be both automatically and/or manually performed.

Figure 4:
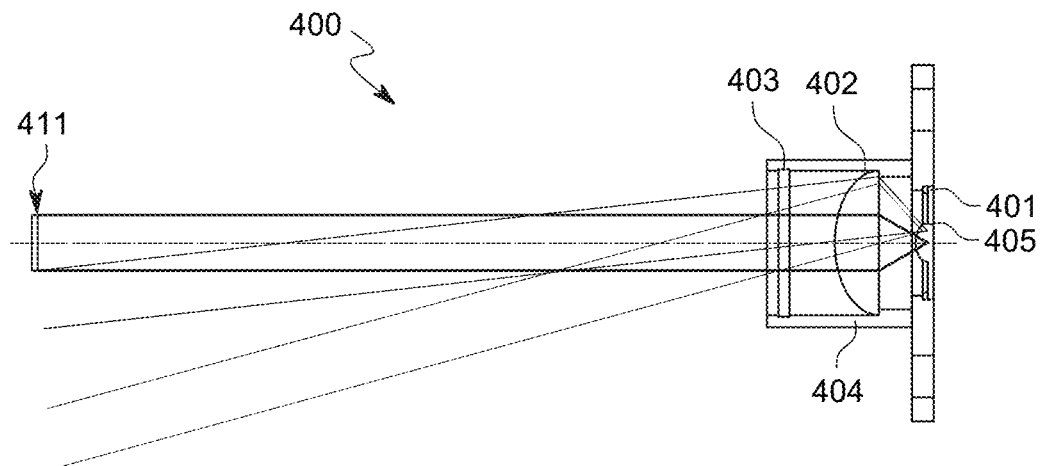
FIG. 4 illustrates a lighting unit according to one embodiment

Now referring to FIG. 4, a diagram of a lighting unit 400 is provide according to one embodiment. In one embodiment, each lighting unit 400 includes a light source 401, a collimating lens 402, and a linear polarizer 403, which may be optionally housed in an integrated housing 404.

According to one embodiment, the light source 401 is a white high-power phosphor LED. In embodiments, the light source 401 can be of different colors depending on the intended application. For example, if the material is known to be of a specific color, light sources that highlight the features of the sample may be used. However, for a more generic system, a white light source allows reflection of light from samples of any color or color mix, thus it is a good choice for such a system. In addition, a high-power source, such as a high-power phosphor LED, provides for fast processing because it shines enough light for longer exposure times and is substantially uniform in the power, intensity, and color of the output light. For example, a conventional flash light source, while may be used in some applications, would not be as uniform as a high-power phosphor white LED.

The lighting unit 400 also includes a lens 402. In one embodiment, lens 402 may be aspheric condenser lens, or other collimating lens. In other embodiments, different types of lenses may be used. The housing 404 maintains the distance between the light source 401 and the lens 402. According to one aspect of embodiments, the preferred distance between the lighting source 401 and the lens 402 is a distance that ensures that the illumination on the sample has a uniform distribution of power and with the maximum possible power density, in the dimensions of capture of the image. This distance is also dependent on the lens diameter and focal length as further described below.

If lens 402 is placed at its focal distance from the light source 401, collimation of the light beams is at the theoretical maximum, that is the divergence is the smallest. If lens 402 is placed at a distance that causes an of the light source 401 image to be projected on the sample 411, then the amount of light reaching the sample is at its maximum. The relationship between focal distance of the lens 402 and distances between the lens 402 and the light source 401 and the lens 402 and the sample 411 are given by the following equation:

$$\frac{1}{\text{Focal Length}} = \frac{1}{\text{Lens to Light Source Distance}} + \frac{1}{\text{Lens to Sample Distance}} \quad [\text{Eq. 1}]$$

For example, for a lens 402 having a focal distance of 16 mm and where the sample 411 is located at 700 mm away from the lighting source 401, placing the lens 401 at 16 mm from the light source 401 provides the best (smaller) divergence of the light rays. However, placing the lens 402 at 16.4 mm causes an image of the light source 401 to form over the sample. In this embodiment, these distances are fairly close because the distance from the sample 411 to the lens 402 is relatively large. However, the small difference in distances for the lens placement can result in spots or a "footprint" of the light source 401 over the sample, which causes unevenness of the light on the sample. Given this small tolerance, once the lens 402 is placed at a set distance from the light source 401, if the illumination on the sample is not sufficiently even or uniform, the focusing of the lens 402 may be changed to slightly defocus the light source over the sample as further described below.

According to embodiments, the distance between the light source 401 and the lens 402 is between 5% and 20% of the nominal focal distance of the lens 402, preferably around 10%. For example, for a lens 401 with a 16 mm focal distance, the placement can be up to 17-18 mm from the light source 401. In that position the light ray divergence is not ideal, but it is sufficient and the quantity of light over the sample 411 is not substantially decreased. In other embodiments the lens 402 can be placed at larger or shorter distances from the light source 401, while provide similar performance.

The optimization of the image capture requires optimizing the uniformity of the power distribution over the area of the sample to be captured, and maximizing the optical power density, which reduces the exposure time of the captures. To accomplish this, directional light sources are preferred. However, most light sources, like LEDs, emit light in multiple directions. For example, some LEDs emit light almost hemispherically around each point source. To increase the density of optical power on the sample, it is desirable to use collimating lenses 402 that collect the light emitted by the light source 401 and direct it towards the sample.

In such embodiments, the lens diameter is selected to optimize the tradeoff between maximizing the amount of light shed over the sample and minimizing the divergence of the rays of light. The larger the diameter of the lens the bigger amount of light that reaches the sample but the smaller the diameter of the lens the smaller divergence of rays directed at the sample. The divergence over the sample D is provided by the following equation:

$$D = \frac{(\text{Sample Size} + \text{Lens Size})}{2 * \text{Lens to Sample Distance}} \quad [\text{Eq. 2}]$$

For example, for a Sample Size of 10 mm and a Lens to Sample Distance of between 35 cm to 70 cm, a 1-inch diameter provides about 1-2 degrees of divergence, which provides a substantially planar wave-front at the sample. For micro-scale image capturing according to embodiments described herein, a substantially planar wave-front is provided with lenses 402 with diameters in the range of 0.5 to about 1.5 inches.

In addition, lenses 402 are provided with short focal lengths. Focal length defines the divergence of the light exiting the lens, which is given by the following equation:

$$\text{Divergence Out} = \frac{\text{Light Source Size}}{2 * \text{Focal Length}} \quad [\text{Eq. 3}]$$

The larger the focal length the less divergent the rays exiting the lens and thus the more concentrated the light at the sample. Similarly, the smaller the focal length, the more quantity of light that is gathered by the lens. Thus, according to embodiments, the amount of light reaching the sample is maximized for a focal length of between 15 and 20 mm, with an acceptable range of between 10 and 50 mm in various embodiments.

For example, in one embodiment, the lighting modules 400 are designed to produce a low divergence incident beam with a 20 mm effective diameter and 16 mm focal length lenses that are combined with a 3×3 mm LEDs. Overall, according to Eq.3, these light units result in an exit beam divergence of approximately 5°. In this embodiment, the size of the captured target image is 10×7.5 mm, at a distance of 650 mm from the source. Thus, according to Eq. 2, the divergence of the incident beam on the sample is approximately 1.3° horizontal and 1° vertical. Further, as discussed above, with a lens having a focal length of 16 mm, the distance between the light source 401 and the lens 402 is around 18 mm.

According to another aspect of various embodiments, the distance between each light unit 400 and the target sample 411 is maintained constant. For example, in one embodiment, the housing 404 includes a fastening system 405 to the mechanical structure (e.g., item 105 in FIG. 1) that allows to orient the light beam on the sample 411 in a simple and stable way over time. Once each lighting unit 400 is placed in the mechanical structure 105 of the system, the light beam is oriented towards the sample 411. In one embodiment, fasting system 405 includes a rotatable fastener that allows limited rotation of the housing 404 around a central point. In this embodiment, a user can manually rotate the housing towards the sample 411. Alternative fasting systems 405 and methods for orienting the lighting units 400 are contemplated and within the scope of the disclosure. For example, a motorized fastening system 405 may be provided that is controlled by a controller (not shown) remote to the units. For example, a computer executing a software program including control commands for controlling each motorized fasting system 405 may be provided. In another embodiment, a fastening system 405 with springs and fixing screws is used, which allows the lighting source 401 plane to rotate in 3D in a simple way, while being screwed to hold the position to remain stable over time. Other embodiments include fixed fastening systems 405 manufactured to hold the required position for each lighting unit 400 with respect to the sample holder.

According to another aspect of embodiments of the system, the lighting units 400 are calibrated to optimize the lighting of the sample 411 with a front plane-wave illumination. In one embodiment, the maximum power density on the sample 411 is obtained when the lens 402 forms an image of the lighting source 401 on the sample 411. However, given the nature of the emission of light from lighting sources, such as for example white LEDs, the light is typically unevenly distributed and forms spatial spots that lead to non-uniform illumination. According to one embodiment, in order to illuminate the sample 411 with a more uniform light distribution, the lens 402 in each lighting unit 400 is slightly defocused. This will lightly blur the image of the lighting sources on the sample and reduce or eliminate the spots, thereby providing a more uniform illumination at the sample. The slight defocus of the lens 402 causes the spatial emission spots of the lighting sources 401 to be diffused to obtain uniform illumination, while working near the maximum optical power density on the sample 411.

According to embodiments, lens 402 may also include a polarizing filter 403. The polarizing filter 403 may be a linear polarizer that can be rotated to adjust the polarization based on a polarization analyzer and a corresponding polarizing filter module 205 placed on the camera unit. The combination of polarizing filters on the light units 400 and close-up module 300 allow for the separation of light components in subsequent post-processing as discussed above.

Figure 5A:
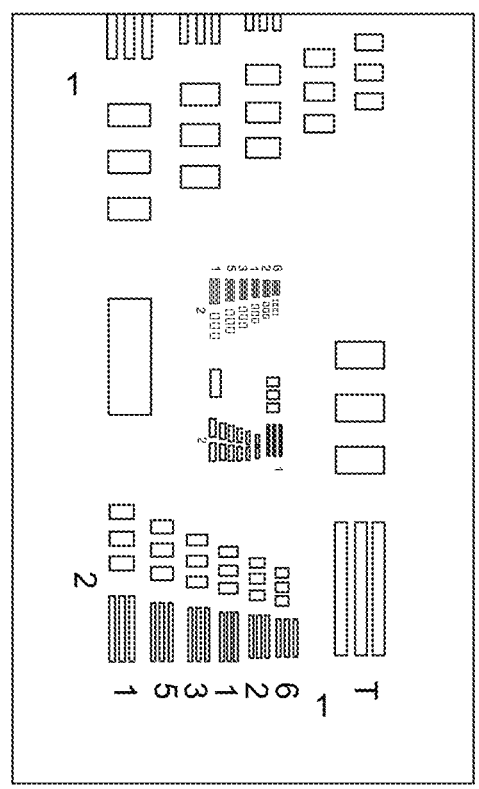
FIG. 5A illustrates a resolution test according to the USAF 1951 standard according to one embodiment.
Figure 5B:
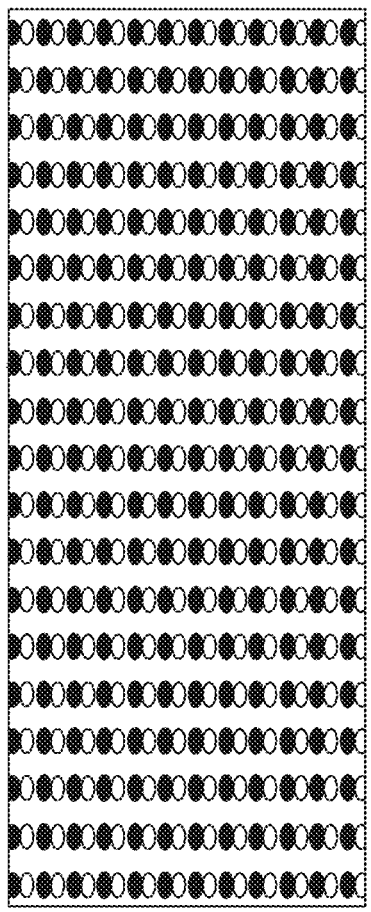
FIG. 5B illustrates a chromatic aberration using different filters according to one embodiment.
Figure 5C:
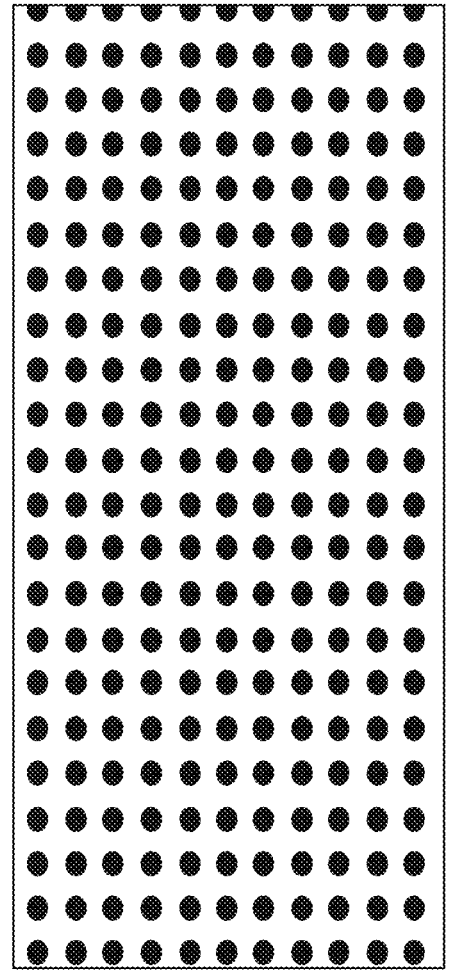
FIG. 5C illustrates an image displacement using different filters according to one embodiment.

Using an embodiment of the system described herein, a series of tests were performed by the inventors to determine the performance of the system. In this embodiment, the optical resolution of the complete optical system was measured using the standard 1951 USAF resolution test (FIG. 5A), to be 7_5, which is equivalent to 203 line-pair/mm. Therefore, in this embodiment, the resolution of the system is limited only by the camera pixel size (454 pixels/mm), and not by the lens and extension used. Further, a 125 μm uniform spacing grid was used to evaluate image distortion and chromatic aberration and displacement. This test shows that the distortion is under the resolution level of the system in the whole image. Chromatic aberration and image displacement were observed when using different RGB filters. Both phenomena are repetitive and can be easily corrected (as shown in FIGS. 5B and 5C). As discussed above, the chromatic aberration is corrected by changing the working distance of the camera for each filter with the motorized linear stage. The displacement is fixed during the subsequent image processing. These corrections remain constant, so they only had to be determined once, during a calibration process.

In this embodiment, the lighting system comprised XP-L2 Cree white LEDs. Their uniformity, both in power and color, was tested using a Laser 2000 Smini spectrometer, with a 225 to 1000 nm spectral range. The average color temperature of the LED batch was 5639 K with a standard deviation of 367K (as shown in FIG. 6). The luminous flux was 245 lm on average with a standard deviation of 43 lm. These variations were calibrated and the results used during the image post-processing stage to correct non-uniformities as needed.

Figure 7:
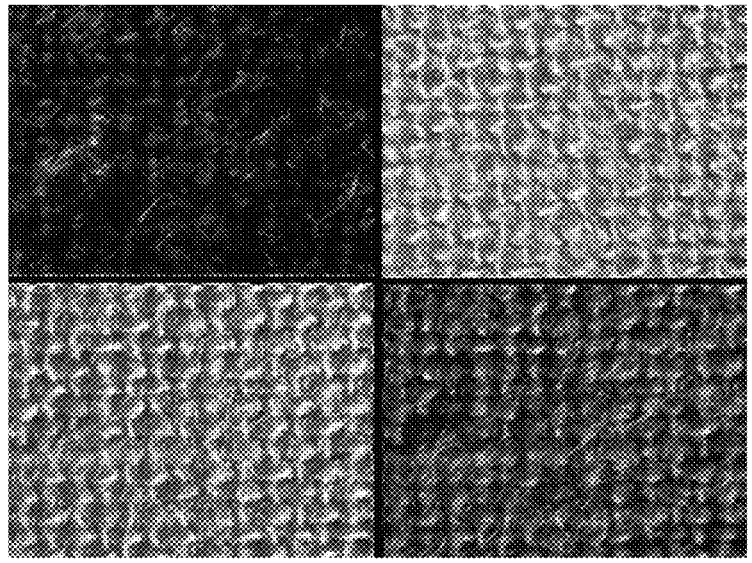
FIG. 7 illustrates images obtained with a camera for a specific angle of illumination according to one embodiment.
Figure 8:
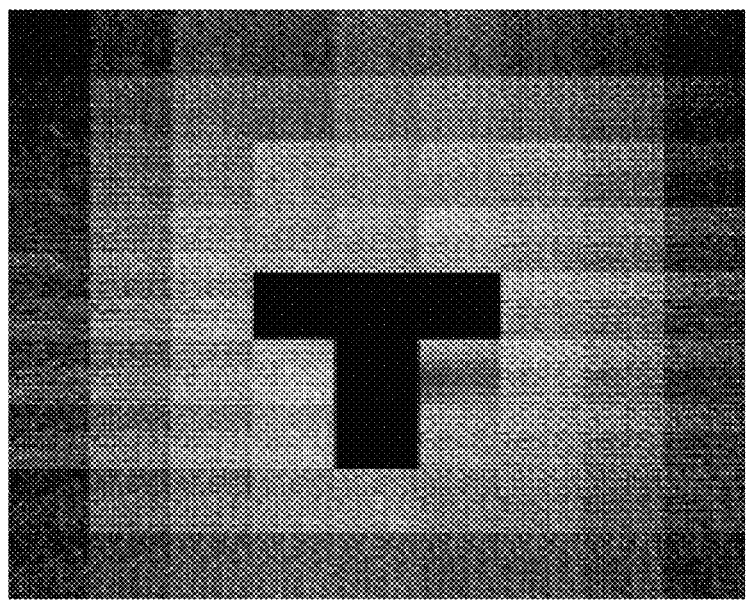
FIG. 8 shows sample image composites obtained with combinations of images taken in each of the 76 light orientations possible according to one embodiment.

FIG. 7 shows images obtained directly from the camera for a given illumination angle according to this embodiment. Already showing how some specific types of fibers (e.g. fly out fibers) emerge under particular lighting conditions. For geometric extraction purposes, diffuse lighting becomes very useful instead of direct collimated light. Taking advantages of the additive nature of light, FIG. 8 show the composite images obtained combining the frames taken under each of the 76 possible incoming light directions The data obtained with this embodiment of the optical capture system is well suited to extract the geometric and optical properties of a fabric sample at the fiber level. These properties are then used as input for a photo-realistic rendering engine based volumetric path tracing. Essentially, the engine simulates the light transport at the scale of fibers, also modeling the anisotropic light scattering patterns at micron scale. Such properties are properly extracted with the presented device, which provides enough resolution, small enough pixel size and good level of light collimation to meet our requirements.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following.

What is claimed is:

1. A micro-scale imaging system comprising:
   an imaging module, the imaging module including an optical sensor, an extension tube, and a lens, the lens coupled to the extension tube and the extension tube disposed in front of the optical sensor guiding light from the lens to the optical sensor, the optical sensor including a plurality of pixels having a pixel size, the lens configured to enable the optical sensor to capture, for each pixel of the plurality of pixels, an imaged area of a fabric sample of the same size as the pixel size;
   a sample holder configured to hold the fabric sample for imaging, the sample holder configured to present the fabric sample to the imaging module without obstruction of incident light or reflected light;
   a lighting module, the lighting module including a plurality of light units spatially arranged around the sample holder and directed towards the sample holder, each light unit configured to provide a planar wave front illumination of the incident light on the fabric sample;
   wherein the lens in the imaging module is positioned with respect to the optical sensor and the extension tube to allow the imaging module to be positioned with respect to the sample holder so as to avoid occlusions of the incident light from the lighting module and so as to capture the reflected light at a planar wave front.

2. The system of claim 1 wherein each light unit includes a collimating lens dimensioned to maximize an intensity of the incident light projected by each light unit on the fabric sample.

3. The system of claim 2, wherein the collimating lens in each light unit has a diameter of between 0.5 and 1.5 inches.

4. The system of claim 2, wherein the collimating lens in each light unit has a nominal focal length of between 15 and 20 mm.

5. The system of claim 4, wherein in each light unit, the collimating lens is positioned at a distance from a source of light in the light unit that is between 5% and 20% of the nominal focal length of the collimating lens.

6. The system of claim 1, wherein the imaging module further comprises a filter module, the filter module including a polarization filter configured to filter the reflected light before reaching the optical sensor.

7. The system of claim 1 further comprising a focusing system, the focusing system comprising a linear displacement platform and a motor, the linear displacement platform mechanically supporting the imaging module and coupled to the motor for linearly moving the imaging module in the direction of the fabric sample, closer or further away, for focusing the imaging module on the fabric sample.

8. The system of claim 1 further comprising a focusing system, the focusing system comprising a membrane lens configured to modify a focal point based on a change to an index of refraction.

9. The system of claim 1, wherein the sample holder further comprises a mount and an electronically controlled motor, the mount configured to be moved by the electronically controlled motor for automatically scanning the fabric sample with the imaging module.

10. The system of claim 1, wherein each light unit comprises one or more high-power white LEDs.

11. The system of claim 1, wherein the optical sensor is one of a monochrome sensor or a color sensor.

12. The system of claim 1, wherein the imaging module includes a monochrome sensor and a filter module, the filter module comprising a plurality of filters, each filter configured to filter a light wave length.

13. The system of claim 1, wherein each light unit of the plurality of light units further comprises a rotatable fastener, the rotatable fastener for mechanically attaching the light unit to the lighting module and allowing rotational motion of the light unit to direct the light unit towards the sample holder.

14. A micro-scale imaging system comprising:
   a sample holder configured to hold a fabric sample for imaging, the sample holder configured to present the fabric sample to a first imaging module and a second imaging module without obstruction of incident light or reflected light;
   a first imaging module, the first imaging module comprising one or more distant digital cameras positioned at a fixed location with respect to the sample holder, the distant digital cameras configured to capture one or more images of an entire fabric sample for determining a plurality of regions in the fabric sample;
   a second imaging module, the second imaging module comprising one or more close-up digital cameras, each including a lens and a corresponding optical sensor, each optical sensor including a plurality of pixels having a pixel size, each lens configured to enable the corresponding optical sensor to capture, for each pixel of the plurality of pixels, an imaged area of the fabric sample of the same size as the pixel size;

an illumination module comprising a plurality of light units, each light unit configured to provide a planar wave front illumination of the fabric sample at each of the plurality of regions in the fabric sample.

15. The system of claim 14, wherein each light unit includes a collimating lens dimensioned to maximize an intensity of incident light projected by the light unit on the fabric sample.

16. The system of claim 15, wherein the collimating lens in each light unit has a diameter of between 0.5 and 1.5 inches.

17. The system of claim 15, wherein the collimating lens in each light unit has a nominal focal length of between 15 and 20 mm.

18. The system of claim 17, wherein in each light unit, the collimating lens is positioned at a distance from a source of light in the light unit that is between 5% and 20% of the nominal focal length of the collimating lens.

19. The system of claim 14, wherein the second imaging module further comprises a filter module for each of the one or more close-up digital cameras, each of the filter modules mechanically attached to one close-up digital camera of the one or more close-up digital cameras and including a polarization filter configured to filter a light reflected by the fabric sample before reaching the one close-up digital camera.

20. The system of claim 14 further comprising a focusing system, the focusing system comprising a linear displacement platform and a motor, the linear displacement platform mechanically supporting the second imaging module and coupled to the motor for linearly moving the second imaging module in the direction of the fabric sample, closer or further away, for focusing the second imaging module on the fabric sample.

21. The system of claim 14 further comprising a focusing system, the focusing system comprising a membrane lens configured to modify a focal point based on a change to an index of refraction.

22. The system of claim 14, wherein the sample holder further comprises a mount and an electronically controlled motor, the mount configured to be moved by the electronically controlled motor for automatically scanning the fabric sample with the second imaging module.

23. The system of claim 14, wherein each light unit comprises one or more high-power white LEDs.

24. The system of claim 14, wherein the one or more close-up digital cameras include one of a monochrome sensor or a color sensor.

25. The system of claim 14, wherein the one or more close-up digital cameras in the second imaging module include a monochrome sensor and a filter module, the filter module comprising a plurality of filters, each filter configured to filter a light wave length.

26. The system of claim 14, wherein each light unit of the plurality of light units further comprises a rotatable fastener, the rotatable fastener for mechanically attaching the light unit to the illumination module and allowing rotational motion of the light unit to direct the light unit towards the sample holder.

* * * * *